United States Patent [19]

Inoue

[11] Patent Number: 5,986,763
[45] Date of Patent: Nov. 16, 1999

[54] METHOD FOR MEASURING HEIGHTS OF BUMPS AND APPARATUS FOR MEASURING HEIGHTS OF BUMPS

[75] Inventor: Mitsuji Inoue, Yokohama, Japan

[73] Assignee: Kabushiki Kaisha Toshiba, Kawasaki, Japan

[21] Appl. No.: 09/259,319

[22] Filed: Mar. 1, 1999

[30] Foreign Application Priority Data

Jul. 29, 1997 [JP] Japan ..................................... 9-203012
Jul. 27, 1998 [JP] Japan ................................. 10-211110

[51] Int. Cl.$^6$ .................................................. G01B 11/24
[52] U.S. Cl. ........................................... 356/376; 348/126
[58] Field of Search ..................................... 356/376, 375, 356/394, 237.1, 237.5; 348/87, 92, 125, 126; 382/145, 146, 147, 149; 395/94

[56] References Cited

U.S. PATENT DOCUMENTS

| | | | |
|---|---|---|---|
| 4,873,651 | 10/1989 | Raviv ....................................... | 356/375 |
| 5,013,927 | 5/1991 | Tsikos et al. ............................. | 356/376 |
| 5,048,965 | 9/1991 | Amir ........................................ | 356/376 |
| 5,440,391 | 8/1995 | Smeyers et al. ......................... | 356/376 |
| 5,774,224 | 6/1998 | Kerstens .................................. | 356/359 |
| 5,812,368 | 9/1998 | Jackson et al. .......................... | 356/376 |
| 5,818,594 | 10/1998 | Lukander ................................ | 356/376 |

*Primary Examiner*—Hoa Q. Pham
*Attorney, Agent, or Firm*—Oblon, Spivak, McClelland, Maier & Neustadt, P.C.

[57] ABSTRACT

A bump-height measuring apparatus for measuring heights of projecting bumps formed on a surface of a work comprises a holding section for holding the work and relatively positioning the work, an illuminating section for emitting light from two positions onto that region of the work held by the holding section, in which bumps to be measured in height are located, such that the bumps project shadows on the work, the two positions being opposite to each other, and each of the positions being located at a predetermined elevation angle with respect to the region, an imaging section for imaging the region onto which the light is emitted from the two positions in the illuminating step, and outputting image signals producing images including shadow images of the bumps, the shadows of each of the bumps extending in two directions, respectively, a shadow extracting section for extracting the shadow images from the images produced by the image signals output from the imaging section, and then outputting binary image signals producing the shadow images, and an arithmetic section for determining lengths between distal ends of the shadow images of the bumps on the basis of the binary image signals output from the shadow extracting section, and then determining heights of the bumps on the basis of the determined lengths and the elevation angle.

19 Claims, 5 Drawing Sheets

INPUT OF IMAGE

METHOD FOR MEASURING HEIGHTS OF BUMPS AND APPARATUS FOR MEASURING HEIGHTS OF BUMPS

BACKGROUND OF THE INVENTION

The present invention relates to a bump-height measuring method and a bump-height measuring apparatus, both for measuring the heights of projecting bumps formed on the surface of a work, and in particular, for measuring the heights of minute bumps formed on a circuit board, an LSI chip or the like, at a high speed and with high accuracy.

A light cutting method and a confocal method are well known as methods for measuring the heights of projections formed on the surface of an object.

The light cutting method is a method for emitting strip-shaped light onto the surfaces of projections, and determining the heights thereof from the amount of displacement of the emitted light between the surface of an object and the surfaces of the projections.

The confocal method is based on the following fact:

When light is emitted onto an object in such a manner as to form a spot on the surface of the object, then reflects from the object, and passes through a pinhole, the amount of light emitted onto a confocal point is the largest in an area onto which the light passing through the pinhole is emitted. To be more specific, according to the confocal method, the heights of projections are determined on the basis of the movement amount of a detection optical system or a work which is measured when the system or the work is moved vertically to detect a confocal point with respect to projections and a reference surface of the object.

If each of projections has a considerably small height of, i.e., several hundred microns, the above height measuring methods cause the following inconveniences:

The light cutting method, for example, needs to reduce the width of strip-shaped light to be emitted, and emit such strip-shaped light at a small angle with respect to an object to be measured. Further, it must increase resolving power for detecting displacement of the light as mentioned above. The confocal point method, for example, needs to decrease the size of the light spot of emitted light, and increase vertical movement-resolving power.

Moreover, the above height measuring methods have further disadvantages. For example, if tens of thousands of projections are dispersedly located in a large area, and their heights must be measured in a short time period, the following problems arise:

Each time the height of each of the projections will be measured, the object must be positioned with high accuracy, and light must be emitted onto each projection with high accuracy. Thus, the heights of the projections cannot efficiently be measured. In other words, they cannot be measured in a short time period.

In view of the foregoing, the object of the present invention is to provide a bump-height measuring method and a bump-height measuring apparatus, both for measuring the heights of projecting bumps formed on the surface of a work, at a high speed and with high accuracy.

BRIEF SUMMARY OF THE INVENTION

The first object of the present invention is to provide a bump-height measuring method for measuring the heights of projecting bumps formed on the surface of a work, at a high speed and with high accuracy.

According to the method of the present invention, in an illuminating step, light is emitted from two positions onto that region of the work in which bumps to be measured in height are located, such that the bumps project shadows on the work, the two positions being opposite to each other with respect to the region, and each of the positions being located at a predetermined elevation angle with respect to the region; in an imaging step, the region is imaged, and image signals producing images having shadow images of the bumps are output, the shadow images of each of the bumps extending in two directions, respectively; in a shadow extracting step, the shadow images are extracted from the images produced by the image signals, and binary image signals producing the shadow images are output; and in a shadow-length arithmetic step, the lengths between distal ends of the shadow images of the bumps are determined on the basis of the binary image signals, and then the heights of the bumps are determined on the basis of the determined lengths and the elevation angle. By virtue of the above features, the method of the present invention can easily measure the heights of the bumps at a high speed and with high accuracy, without the need to position the work with high accuracy, and to improve the resolving power of a measuring device.

The second object of the present invention is to provide a bump-height measuring apparatus for measuring the heights of projecting bumps formed on the surface of a work, at a high speed and with high accuracy.

The apparatus of the present invention images shadows of bumps by emitting light thereto from two positions opposite to each other, to thereby obtain images including the shadow images of the bumps, which the shadow images of each of the bumps extending in two directions, respectively, and outputs image signals producing the images. Then, the apparatus extracts only the shadow images from the images produced by the image signals, and outputs binary image signals producing the shadow images, and determines the lengths between the distal ends of the shadow images of the bumps on the basis of the binary image signals, to thereby determine the heights of the bumps.

By virtue of the above structural features, the apparatus can easily measure the heights of the bumps at a high speed and with high accuracy, without the need to position the work with high accuracy, and to improve the resolving power of a measuring device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention will be explained with reference to the accompanying drawings.

Figure 1:
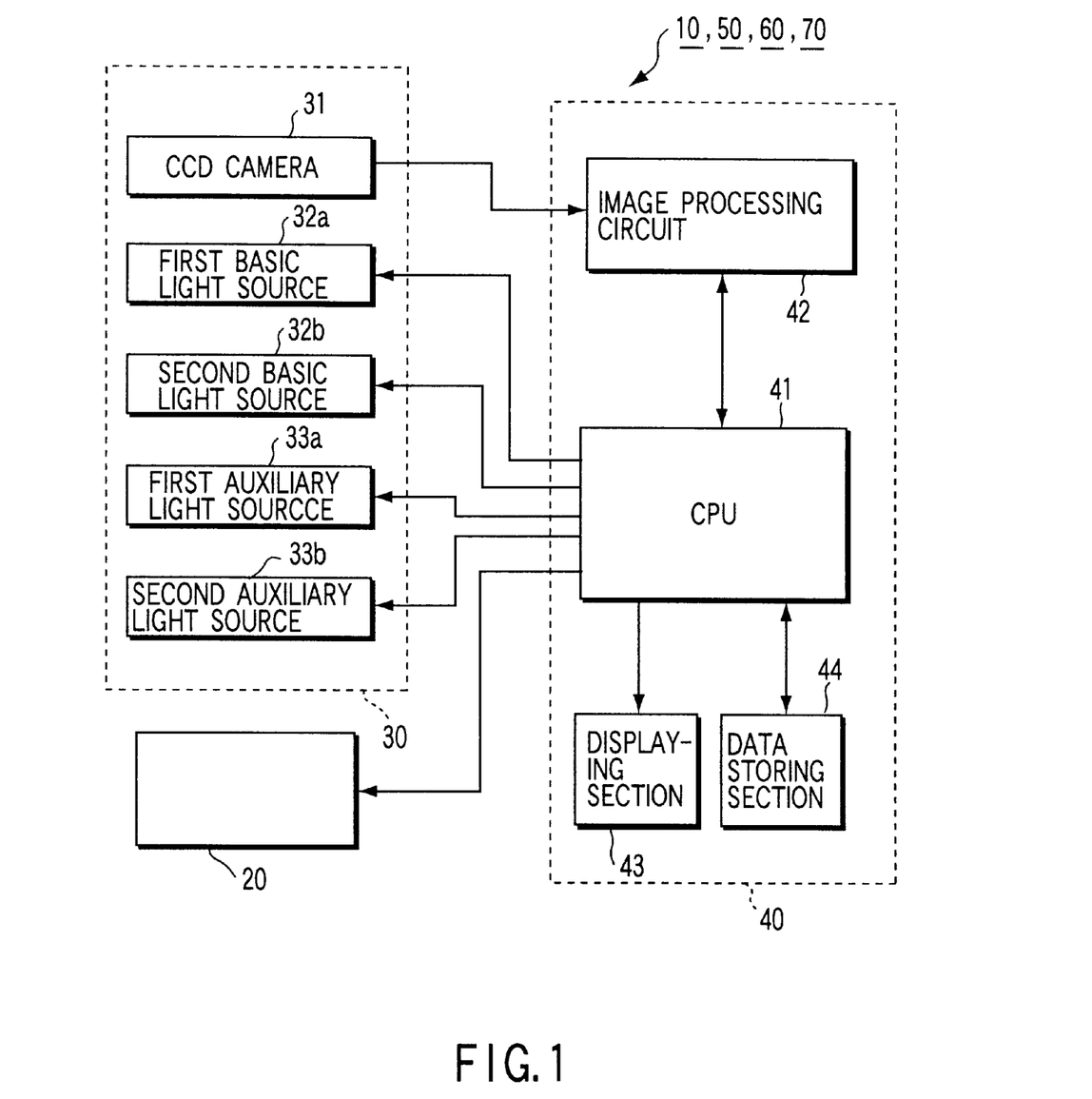
FIG. 1 is a block diagram of a bump-height measuring apparatus according to the first embodiment of the present invention.
Figure 2A:
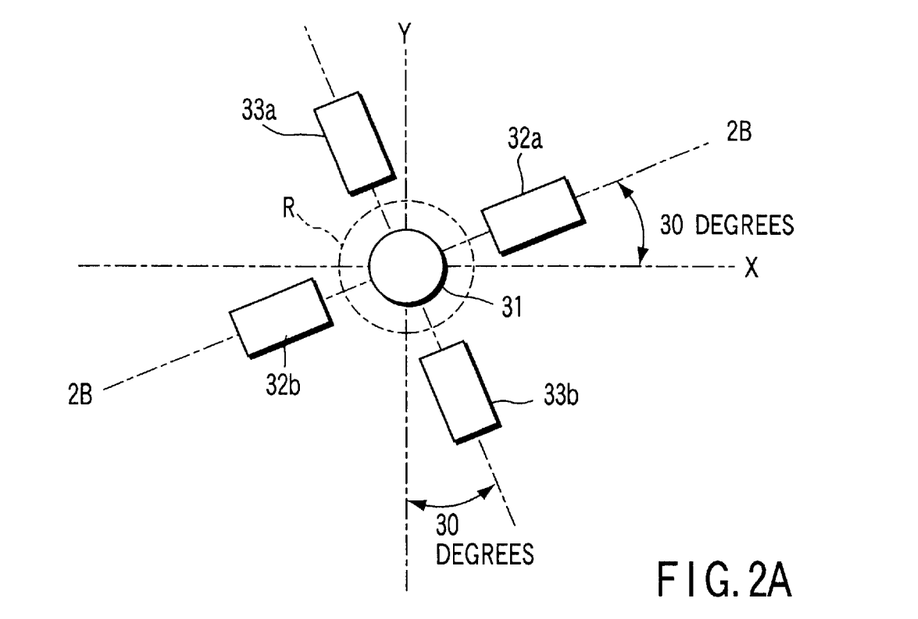
FIGS. 2A and 2B are views for showing a main portion of the bump-height measuring apparatus.
Figure 2B:
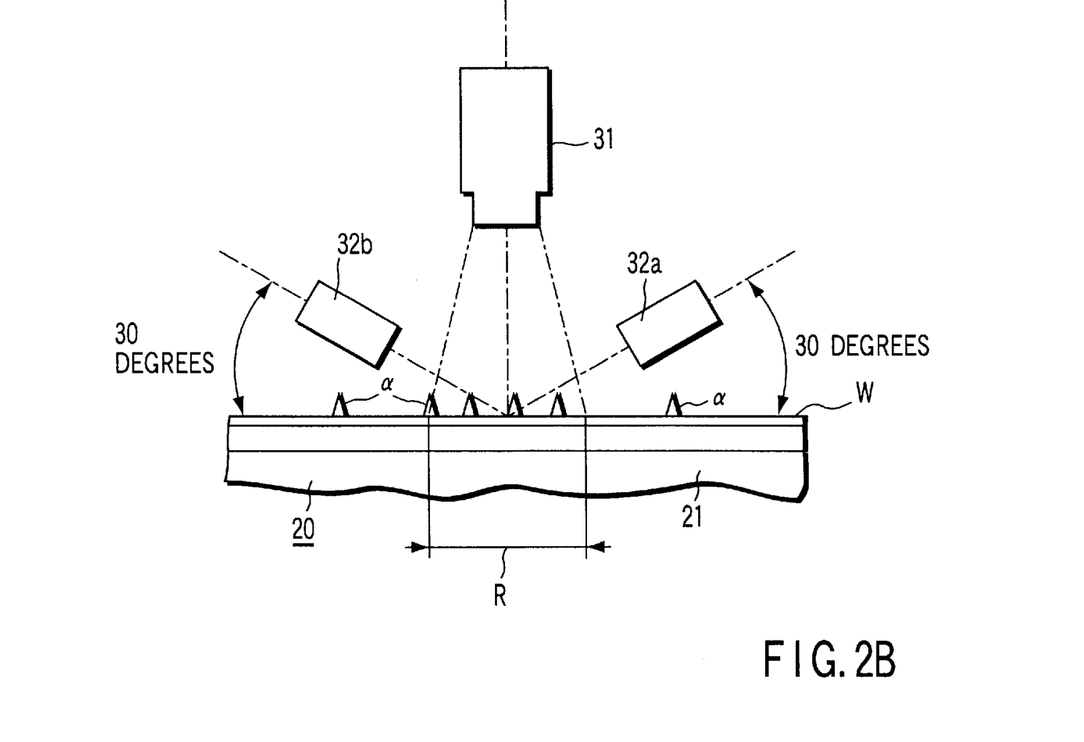

FIG. 1 is a block diagram showing the structure of a bump-height measuring apparatus 10 according to the first embodiment. FIGS. 2A and 2B are views for showing a main portion of the bump-height measuring apparatus 10. FIG. 2A is a plan view, and FIG. 2B is a cross-sectional view taken along line 2B—2B in FIG. 2A. Referring to FIGS. 2A and 2B, W denotes a board (work), and α denotes bumps projectingly formed on the board. In addition, X and Y in FIG. 2A denote horizontal axes perpendicular to each other.

The bump-height measuring apparatus 10 comprises a holding section 20, an optical system section 30 (including an illuminating section and an imaging section), and a controlling section 40. The holding section 20 is provided to hold by suction the board W horizontally, and position the board W with respect to a CCD camera 31 which will be explained later. The optical system section 30 is provided above the holding section 20. The controlling section 40 controls the holding section 20 and the optical system section 30.

More specifically, the holding portion 20 includes an XY table 21 for holding by suction the board W on an upper surface of the XY table 21, and at the same time positioning the board W.

The optical system portion 30 comprises the CCD camera 31, a first basic light source 32a, a second basic light source 32b, a first auxiliary light source 33a, and a second auxiliary light source 33b. The CCD camera 31 is located opposite to the XY table 21. The first basic light source 32a serves as a parallel illumination light source for illuminating an image pickup region (the field of view) R of the CCD camera 31.

The first and second basic light sources 32a and 32b are located opposite to each other with respect to the image pickup region R. Each of the first and second basic light sources 32a and 32b is located on an imaginary line inclined at 30 degrees in a counter-clock wise direction with respect to the X axis, and on an imaginary line inclined at 30 degrees (elevation angle) with respect to the board W.

The first and second auxiliary light sources 33a and 33b are located opposite to each other with respect to the image pickup region R of the CCD camera 31. Each of the first and second auxiliary light sources 33a and 33b is located on an imaginary line inclined at 30 degrees in the counter-clock wise direction with respect to the Y axis, and on an imaginary line inclined at 30 degrees (elevation angle) with respect to the board W.

The controlling section 40 comprises a CPU 41, an image processing circuit 42 connected to the CPU 41, a displaying section 43 such as a CRT for displaying bump-height data representing the heights of bumps α provided on the board W, and a data storing section 44 for storing data of a hard disk, etc. which stores the bump-height data.

The CPU 41 calculates the height of each bump α on the basis of data L and the elevation angle of each of the first and second basic light sources 32a and 32b. The data L represents the lengths of shadow images of the bumps α, and is obtained by the image processing circuit 42. Furthermore, the CPU 41, as explained later, serves to control the controlling section 20, the optical system section 30, and the image processing circuit 42 in accordance with a program stored in advance in the CPU 41. The image processing circuit 42 receives image signals from the CCD camera 31, which are obtained when the first and second basic light sources 32a and 32b are successively lit. The image processing circuit 42 performs an image processing arithmetic on the basis of the image signals, to thereby extract the shadow images, and then outputs the data L representing the lengths of the shadow images. The image processing arithmetic will be discussed later.

The bump-height measuring apparatus having the above structure measures the height of each bump α on the board W in the following manner:

Suppose that for example, the board W has a length of 540 mm and a width 440 mm (540 mm×440 mm), and is formed of copper foil, and that approximately twenty thousand bumps α are provided, and each of the bumps α is conical, and has a height of 100 to 300 μm and a diameter of 100 to 300 μm.

First of all, a board W to be measured by the CCD camera 31 is held by suction on the table 21 of the holding section 20, and a desired region of the table 21 is positioned within the image pickup region R of the CCD camera 31 on the basis of view-field coordinates which are programmed in advance in the CPU 41.

Figure 3A:
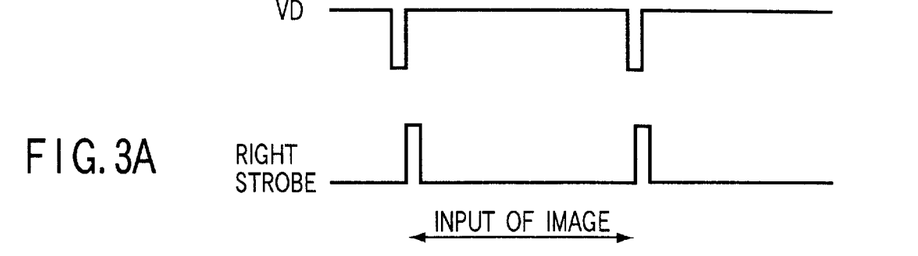
FIGS. 3A and 3B are views for use in explaining operation timing of the bump-height measuring apparatus.
Figure 4A:
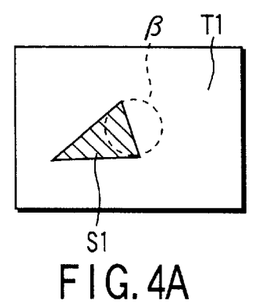
FIGS. 4A to 4F are views for showing examples of images obtained by the bump-height measuring apparatus.

As shown in FIG. 3A, the first basic light source 32a is lit (the first strobe is lit) for a predetermined time period in response to an image synchronizing signal (VD), an image pickup operation is performed A[] by the CCD camera 31, and an image obtained by the operation is stored as image data in an image memory M1 which is provided in the image processing circuit 42. FIG. 4A is a schematic view of the image as the image data stored in the image memory M1. In FIG. 4A, S1 denotes a shadow of a bump α, and T1 denotes a portion other than the shadow. In FIGS. 4A to 4E, a broken line β denotes the position of the bump α.

Figure 3B:
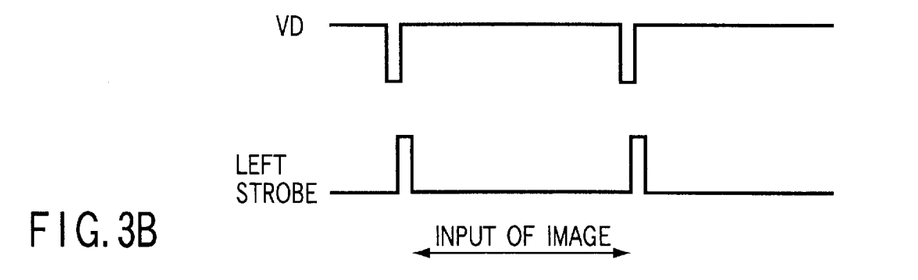
Figure 4B:
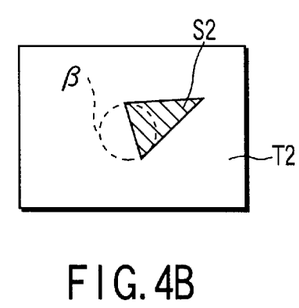

Actually, a plurality of bumps α are located within the image pickup region R of the CCD camera 31. However, only one bump α will be referred to in the following explanation:

Next, as shown in FIG. 3B, the second basic light source 32b is lit (the left strobe is lit) for a predetermined time period in response to an image synchronizing signal (VD), and an image obtained by an image pickup operation is stored as image data in an image memory M2 which is provided in the image processing circuit 42. FIG. 4B is a schematic view of the image as the image data stored in the image memory M2. In FIG. 4B, S2 denotes a shadow of the bump α, and T2 denotes a portion other than the shadow.

Figure 4C:
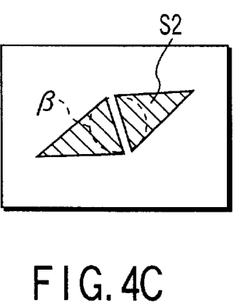
Figure 4D:
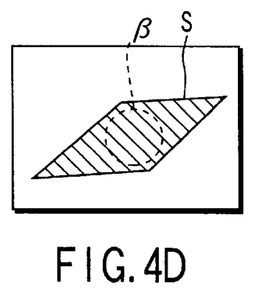
Figure 4E:
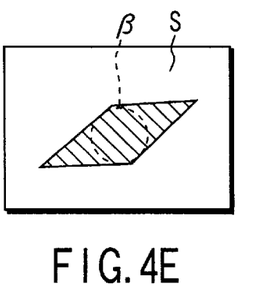

With respect to each of the images as the image data stored in the image memories M1 and M2 in the image processing circuit 42, an absolute value is subtracted in units of one pixel, and then image data obtained due to subtraction of the absolute value is stored in an image memory M3 which is provided in the image processing circuit 42. FIG. 4C is a schematic view of an image corresponding to the image data stored in the image memory M3.

The gradation level of the image stored in the image memory M1 is substantially the same as that of the image stored in the image memory M2, except for the portions T1 and T2. Thus, due to the above-mentioned subtraction of the absolute value, the gradation levels of the portions T1 and T2 can be decreased to substantially 0. Thus, only shadow images S and S' can be made to remain such that they have gradation values obtained by subtracting gradation values of the portions T1 and T2 from the original gradation levels of the shadow images S and S'. As a result, a shadow image S extending in two directions can be obtained.

Next, image data of the obtained shadow image S is binarized by the image processing circuit 42 with respect to a predetermined level determined for extracting only the shadow image S. Then, in image processing, expanding and contracting of the image are repeated the same number of times (for example, expanding, expanding, contracting, and contracting), since there is a case where shadow images S are separated as shown in FIG. 4C. Due to the above image processing, they are connected to each other. Furthermore, the above expanding and contracting are carried out in projecting directions in which the bump α projects shadows, i.e., the shadows extend. Thus, if shadow images of adjacent bumps α arranged in a direction perpendicular to the projecting directions overlap each other, the expanding and contracting can reduce the overlapping area of the shadows. The number of times the expanding and contracting operations are performed is determined appropriately in order that the separated shadow images be connected to each other.

Figure 4F:
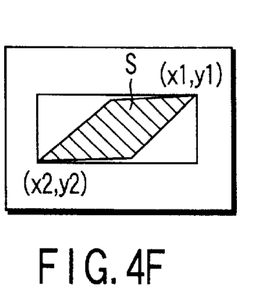

In the image processing circuit 42, two distal end positions (coordinates x1, y1) (coordinates x2, y2) of the shadow image S, as shown in FIG. 4F, are determined by circumscriptively squaring processing. The distance L between the distal end positions is calculated with the following equation:

$$L=\sqrt{((x2-x1)^2+(y1-y2)^2)} \quad (1)$$

Then, on the basis the distance L obtained by using the equation (1) and the elevation angle θ of each of the first and second basic light sources 32a and 32b (the elevation angle θ in this embodiment is 30°), the height H of the bump α is calculated with the following equation (2):

$$H=(L/2)\times\tan\theta \quad (2)$$

As mentioned above, actually, a plurality of bumps α are located within the image pickup region R of the CCD camera 31. Thus, labeling processing is performed on the shadow images of the bumps α, and they are a1 checked by referring to the coordinates of the bumps α which are stored in advance in the CPU 41. When the heights of the bumps α are determined, they are stored as data in the data storing portion 44.

When the heights of the bumps α have completely been measured, the XY table 21 is operated as programmed in advance, and moved such that that region of the board W on which bumps α to be next measured are provided is located within the image pickup region R of the CCD camera R.

Figure 5A:
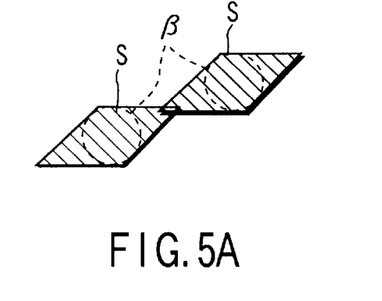
FIGS. 5A and 5B are views for showing another examples of images obtained by the bump-height measuring apparatus.
Figure 5B:
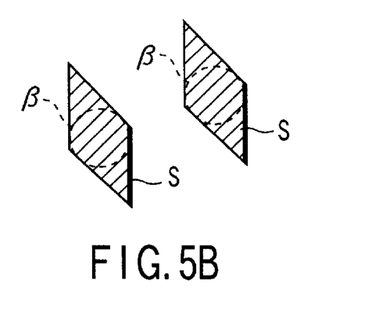

If shadow images of adjacent bumps α overlaps each other as shown in FIG. 5A, and as a result, distal end portions thereof cannot be detected, the first and second auxiliary light sources 33a and 33b are lit in order to obtain fine shadow images as shown in FIG. 5B. In FIG. 5B, a broken line β denotes the positions of the bumps α.

As explained above, the bump-height measuring apparatus 10 according to the first embodiment lights the bump α from two positions which are located opposite to each other with respect to the bumps α, and picks up two images of the bumps α, which include shadow images of the bumps α, the shadow images of each of the bumps α extending in two directions, respectively. At this time, the two images are separately picked up. Then, the apparatus 10 measures the height of each bump α on the basis of the two images. Therefore, it is not necessary to position the board W with high accuracy, or to provide a measuring device having a high resolution.

Figure 6A:
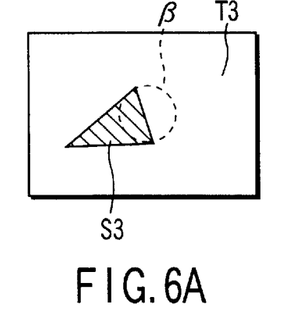
FIGS. 6A to 6C are views for showing examples of images obtained by a bump-height measuring apparatus according to the second embodiment of the present invention.
Figure 6B:
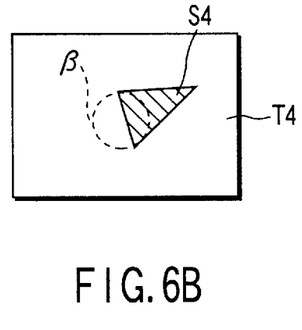
Figure 6C:
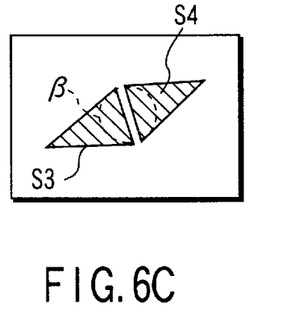

FIGS. 6A to 6C are views for showing examples of images obtained by a bump-height measuring apparatus 50 according to the second embodiment of the present invention. The bump-height measuring apparatus 50 has the same structure as the bump-height measuring apparatus 10, except that it has a color CCD camera for picking up a color image.

In the bump-height measuring apparatus 50, the light emitted from the first basic light source 32a differs in wavelength from that emitted from the second basic light source 32b. For example, the light emitted from one of the light sources 32a and 32b is green, and the light emitted from the other is red. In addition, those light sources illuminate the bumps α at the same time.

With respect to the bump-height measuring apparatus 50 also, the following explanation will also be made by referring to only one bump α:

Due to the above structure of the apparatus 50, a shadow image S3 of the bump α, which is shown in FIG. 6A, is obtained by illumination of the first basic light source 32a. The portion other than the shadow image S3 is a green portion T3. On the other hand, a shadow image S4 of the bump α, which is shown in FIG. 6B, is obtained by illumination of the second basic light source 32b. The portion other than the shadow image S4 is a red portion T4. In FIGS. 6A to 6C, a broken line β denotes the position of the bump α.

The light from the second basic light source 32b is also emitted onto the shadow image S3 obtained by illumination of the first basic light source 32a. However, the light differs in wavelength the light emitted from the first basic light source 32a. Thus, a signal value indicating the shadow S3 differs from a signal value indicating the green portion T3. Similarly, a signal value indicating the shadow S4 differs from a signal value indicating the red portion T4.

By virtue of the above feature, in the image obtained by the CCD camera 31, only the shadow images S3 and S4 can be extracted as shown in FIG. 6C. Based on those extracted shadow images, the bump-height measuring apparatus 50 can calculate the height of the bump α in the same manner as the bump-height measuring apparatus 10.

Figure 7:
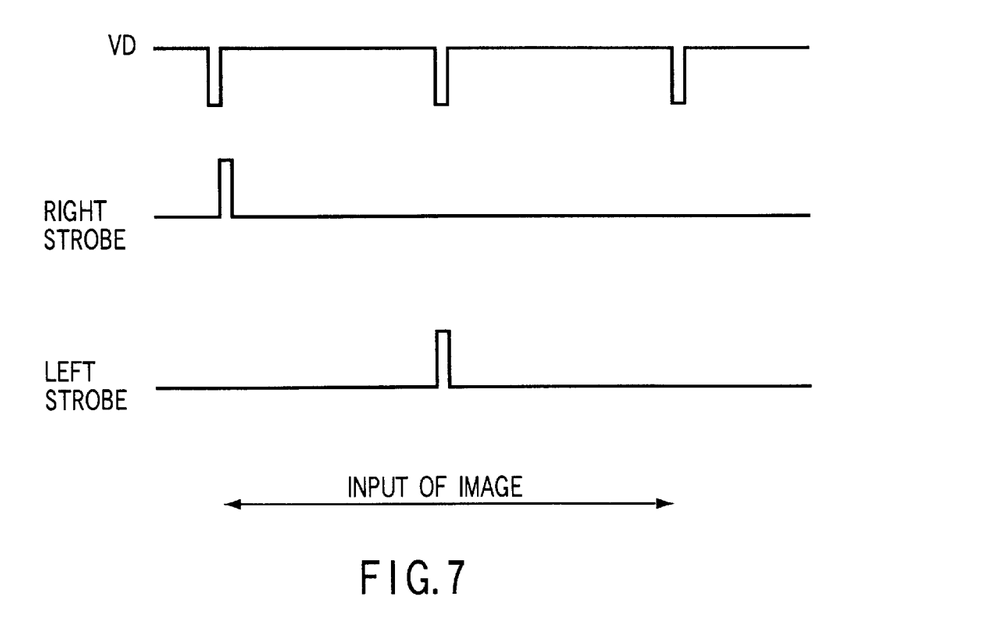
FIG. 7 is a view for use in explaining operation timing of a bump-height measuring apparatus according to the third embodiment of the present invention.

FIG. 7 is a view for illustrating operation timing of a bump-height measuring apparatus 60 according to the third embodiment of the present invention. The bump-height measuring apparatus 60 has the same structure as the bump-height measuring apparatus 50, and thus its detailed explanation will be omitted.

In the bump-height measuring apparatus 60, while an image synchronizing signal (VD) is being supplied two times, illumination of the first basic light source 32a (right strobe) and that of the second basic light source 32b (left strobe) are successively performed, and images obtained due to illumination of the sources 32a and 32b are combined into one image. As a result, an image can be obtained, which includes shadow images extending in two directions as shown in FIG. 4C.

Therefore, the bump-height measuring apparatus 60 does not need to combine images, and can shorten the time period required for the arithmetic operation, as compared with the bump-height measuring apparatus 10.

FIGS. 8A to 8E are views for showing examples of images obtained by a bump-height measuring apparatus 70 according to the fourth embodiment of the present invention. The bump-height measuring apparatus 70 has the same structure as the bump-height measuring apparatus 10.

The bump-height measuring apparatus 70 measures the heights of bumps α in the following manner:

A board W to be measured by the CCD camera 31 is held by suction on the XY table 21 of the holding section 20, and the XY table 21 is positioned within the image pickup region R of the CCD camera 31.

Figure 8A:
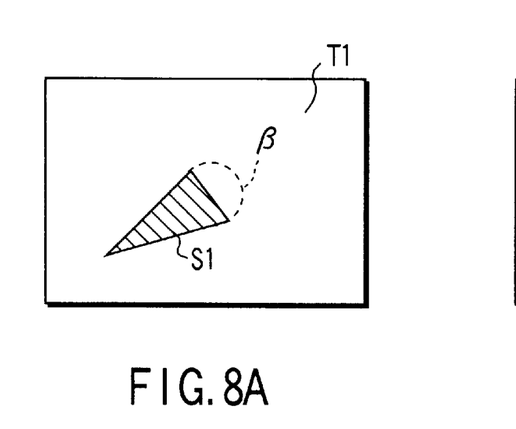
FIGS. 8A to 8E are views for showing examples of images obtained by a bump-height measuring apparatus according to the fourth embodiment of the present invention.

As shown in FIG. 3A, the first basic light source 32a is lit (the right strobe is lit) for a predetermined time period in response to an image synchronizing signal (VD), and the CCD camera 31 picks up an image of the bumps α. Then, image data of the picked-up image is binarized with respect to a predetermined level determined for extracting only image shadows of the bumps α, and then it is stored in the image memory M1 in the image processing circuit 42. FIG. 8A is a schematic view of the image corresponding to the data stored in the image memory M1. In FIG. 8A, S1 denotes a shadow image of the bump α, and T1 denotes a portion other than the shadow image.

Figure 8B:
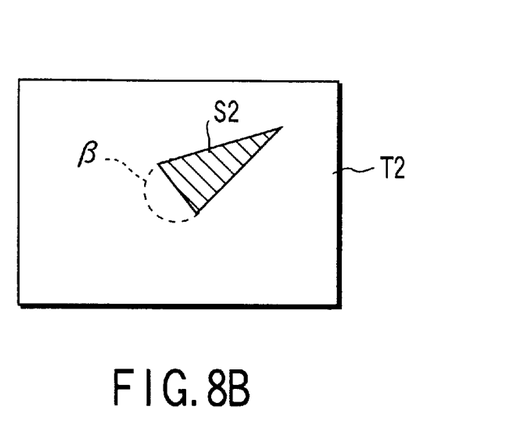

Next, as shown in FIG. 3B, the second basic light source 21b is lit (the left strobe is lit) for a predetermined time period in response to an image synchronizing signal (VD), and an image of the bumps α is picked up by the CCD camera 31. Then, image data of the image is binarized with respect to a predetermined level determined for extracting only a shadow image of the image, and stored in the image memory M2. FIG. 8B is a schematic view of the image stored in the image memory M2. In FIG. 8B, S2 denotes a shadow image of the bump α, and T2 denotes a portion other than the shadow image.

In FIGS. 8A to 8E, a broken line β denotes the position of the bump α.

Figure 8C:
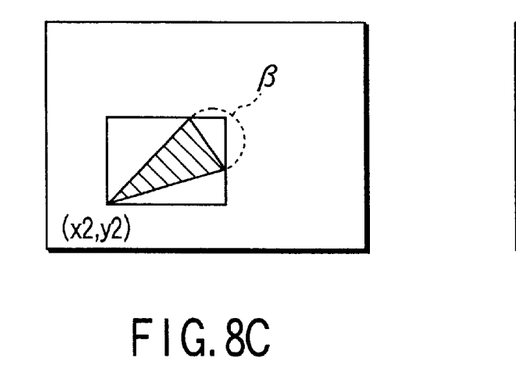
Figure 8D:
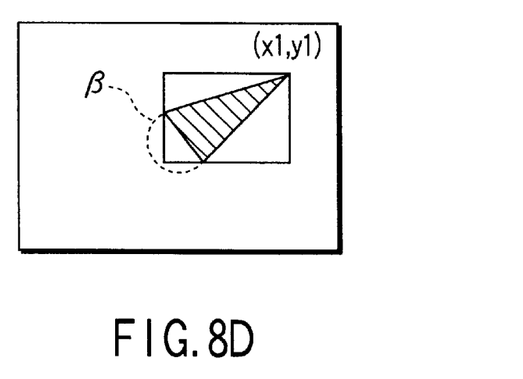

Actually, a plurality of bumps α are located within the image pickup region R of the CCD camera 31. However, one bump α will be referred to in the following explanation:

In the image processing circuit 42, as shown in FIG. 8C, a distal end position of the shadow image S1 (which is represented by coordinates x2, y2) is determined when circumscriptively squaring processing is performed on the data stored in the image memory M1. Similarly, as shown in FIG. 8D, a distal end position of the shadow image S2 (which is represented by coordinates x1, y1) of the shadow S2 is determined by performing circumscriptively squaring processing on the data stored in the image memory M2.

In order to determine the height of the bump α from the distal end position of the shadow image S1 (which is represented by coordinates x2, y2) of the shadow S1 and the distal end position of the shadow image S2 (which is represented by coordinates x1, y1), it is necessary to determine that coordinates x2, y2 and coordinates x1, y1 respectively represent the distal end positions of the shadow images S1 and S2 of the bump α.

Figure 8E:
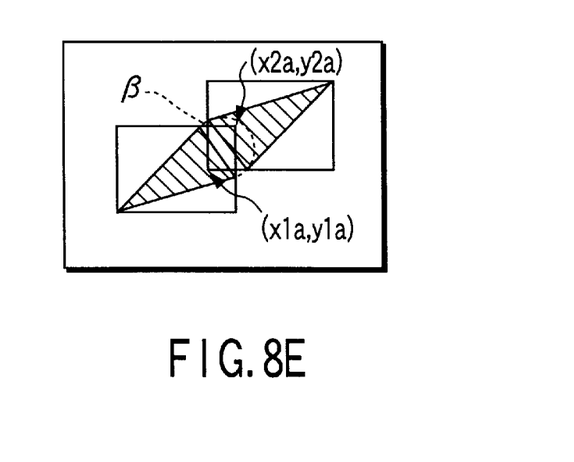

More specifically, with respect to a circumscribed rectangle of the shadow image S1 as data stored in the image memory M1, first of all, corner coordinates x2a, y2a indicating a corner of the circumscribed rectangle are found, the corner being located opposite to another corner thereof, i.e., the distal end position indicated by corner coordinates x2, y2, as shown in FIG. 8E. Then, of the corner coordinates of circumscribed rectangles of shadows of the other bumps α which are image-picked up along with the above bump α, corner coordinates x1a, y1a closest to the above corner coordinates x2a, y2a are found, and the shadow image circumscribed by a rectangle having a corner (distal end position) indicated by the corner coordinates x1a, y1a is regarded as the shadow image S2 of the above bump α.

The total length L of the opposite shadows of the bump α is the length of a line extending between the distal end position (coordinates x2, y2) of the shadow S1 and the distal end position (coordinates x1, y1) of the shadow S2, and is calculated with the following equation (1):

$$L=\sqrt{((x2-x1)^2+(y1+y2)^2)} \quad (3)$$

The height H of the bump α is calculated with an equation (4) below, on the basis of the calculated length L and an elevation angle θ (30° in this embodiment) of each of the first and second basic light sources 32a and 32b.

$$H=(L/2)\times\tan\theta \quad (4)$$

As stated above, actually, a plurality of bumps α are located within the image pickup region R of the CCD camera 31. Thus, labeling processing is performed on shadow images of the bumps α, and they are checked by referring to coordinates of the bumps α which are stored in advance in the CPU 41. When the heights of the bumps α are determined, they are stored as data in the data storing portion 44.

Thereafter, the XY table 21 is operated as programmed in advance, and moved such that that region of the board W on which bumps α to be next measured are provided is located within the image pickup region R of the CCD camera 31. Then, the aforementioned measuring operation is repeated.

As may be understood from the above, the bump-height measuring apparatus 70 according to the fourth embodiment obtains the same effects as the bump-height measuring apparatus 10. In addition, the bump-height measuring apparatus 70 recognizes separately the distal end positions of the two opposite shadows of each bumps α, and thus can be applied to even measurement of the heights of bumps α arranged at a small pitch in a direction where they project shadows.

The present invention is not limited to the above embodiments. To be more specific, in the above bump-height measuring apparatuses, the auxiliary light sources are used instead of the basic light sources when the shadows of bumps overlap with each other. However, instead of use of the auxiliary light sources, the basic light sources or the XY table 21 may be rotated so that the shadows do not overlap. In addition, needless to say, various modifications can be applied within the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A method for measuring heights of projecting bumps formed on a surface of a work, comprising:

an illuminating step of emitting light from two positions onto that region of the work in which bumps to be measured in height are located, such that the bumps project shadows on the work, the two positions being opposite to each other with respect to the region, and each of the positions being located at a predetermined elevation angle with respect to the region;

an imaging step of imaging the region onto which the light is emitted from the two positions in the illuminating step, and outputting image signals producing images including shadow images of the bumps, the shadow images of each of the bumps extending in two directions, respectively, each of the image signals being output when the light is emitted from an associated one of the two positions;

a shadow extracting step of extracting the shadow images from the images produced by the image signals output in the imaging step, and then outputting binary image signals producing the shadow images; and a shadow-length arithmetic step of determining lengths between distal ends of the shadows of the bumps on the basis of the binar image signals output in the shadow extracting step, and then determining heights of the bumps on the basis of the determined lengths and the elevation angle.

2. The bump-height measuring method according to claim 1, wherein in the illuminating step, the light is emitted successively from the two positions, and in the imaging step, each of the image signals is generated and output when the light is emitted from an associated one of the two positions in the illuminating step.

3. The bump-height measuring method according to claim 2, wherein in the imaging step, the images including the shadow images of the bumps are recorded such that the images are combined into in one image.

4. The bump-height measuring step according to claim 1, wherein the illuminating step includes a step of changing the two positions to another positions, if the shadow images of adjacent ones of the bumps overlap each other.

5. The bump-height measuring step according to claim 1, wherein the shadow extracting step is a step of connecting the shadows extending in the two directions, by expanding and contracting the images the same number of times.

6. The bump-height measuring method according to claim 5, wherein in the connecting step, the images are expanded and contracted in the two directions only.

7. The bump-height measuring method according to claim 1, wherein in the shadow extracting step, a value is subtracted in units of one pixel with respect to each of the images produced by the image signals, to thereby obtain an image signal producing an image excluding a portion other than the shadow images, the obtained image signal is binarized with reference to a reference value for separating the shadow images from the other portion, and then the binarized image signal is output.

8. The bump-height measuring method according to claim 1, wherein in the shadow extracting step, a value is added in units of one pixel with respect to each of the images produced by the image signals, to thereby obtain an image signal, and the obtained image signal is binarized with respect to a reference value for separating the shadow images from the other portion.

9. The bump-height measuring method according to claim 1, wherein in the illuminating step, the light is emitted from the two positions at the same time, and the light emitted from one of the positions has a different wavelength from the light emitted from the other.

10. A bump-height measuring method for measuring heights of projecting bumps formed on a surface of a work, comprising:

an illuminating step of emitting light successively from two positions onto that region of the work in which bumps to be measured in height are located, such that the bumps project shadows on the work, the two positions being opposite to each other with respect to the region, and each of the positions being located at a predetermined elevation angle with respect to the region;

an imaging step of imaging the region onto which the light is emitted from the two positions in the illuminating step, and outputting two image signals producing two images including shadow images of the bumps, each of the two image signals being output when the light is emitted from an associated one of the two positions;

a shadow extracting step of extracting the shadow images from the two images produced by the two image signals generated in the imaging step, and then outputting two binary image signals producing the shadow images; and a shadow-length arithmetic step of determining distal end positions of the shadow images of the bumps on the basis of the two binary image signals output in the shadow extracting step, determining lengths between the distal end positions as shadow lengths, and then determining heights of the bumps on the basis of the shadow lengths and the elevation angle.

11. A bump-height measuring apparatus for measuring heights of projecting bumps formed on a surface of a work, comprising:

a holding section for holding the work and relatively positioning the work;

an illuminating section for emitting light from two positions onto that region of the work held by the holding section, in which bumps to be measured in height are located, such that the bumps project shadows on the work, the two positions being opposite to each other, and each of the positions being located at a predetermined elevation angle with respect to the region;

an imaging section for imaging the region onto which the light is emitted from the two positions in the illuminating step, and outputting image signals producing images including shadow images of the bumps, the shadows of each of the bumps extending in two directions, respectively;

a shadow extracting section for extracting the shadow images from the images produced by the image signals output from the imaging section, and then outputting binary image signals producing the shadow images; and an arithmetic section for determining lengths between distal ends of the shadow images of the bumps on the basis of the binary image signals output from the shadow extracting section, and then determining heights of the bumps on the basis of the determined lengths and the elevation angle.

12. The bump-height measuring apparatus according to claim 11, wherein the illuminating section emits successively the light from the two positions, and the imaging section generates and outputs each of the image signals when the light is emitted from an associated one of the two positions by the illuminating section.

13. The bump-height measuring apparatus according to claim 12, wherein the imaging section records the images including the shadow images of the bumps such that the images are combined into one image.

14. The bump-height measuring apparatus according to claim 11, wherein the illuminating section changes the positions to another positions, if the shadow images of adjacent ones of the bumps overlap each other.

15. The bump-height measuring apparatus according to claim 11, wherein the shadow extracting section has a connecting section for connecting the shadow images of said each bump, by expanding and contracting the images the same number of times.

16. The bump-height measuring apparatus according to claim 15, wherein the connecting section expands and contracts the images in the two directions only.

17. The bump-height measuring apparatus according to claim 11, wherein the shadow extracting section subtracts a value in units of one pixel with respect to each of the images produced by the image signals, to thereby obtain an image signal producing an image excluding a portion other than the shadow images, then binarizes the obtained image signal with respect to a reference value for separating the shadow images from the other portion, and outputs the binarized image signal.

18. The bump-height measuring apparatus according to claim 11, wherein the shadow extracting section adds a value in units of one pixel with respect to each of the images produced by the image signals, to thereby obtain, an image signal, and the obtained image signal is binarized with respect to a threshold value serving as a reference value for separating the shadow images from the other portion.

19. The bump-height measuring apparatus according to claim 11, wherein the illuminating section emits the light from the two positions at the same time, and the light emitted from one of the positions has a different wavelength from the light emitted from the other.

* * * * *

UNITED STATES PATENT AND TRADEMARK OFFICE
CERTIFICATE OF CORRECTION

PATENT NO. : 5,986,763

DATED : November 16, 1999

INVENTOR(S): Mitsuji INOUE

It is certified that an error appears in the above-identified patent and that said Letters Patent is hereby corrected as shown below:

On the title page, item [30], should read:

--[30] Foreign Application Priority Data

Jul. 27, 1998 [JP] Japan ................................ 10-211110 --

Signed and Sealed this

Ninth Day of January, 2001

Attest:

Q. TODD DICKINSON

*Attesting Officer*          *Commissioner of Patents and Trademarks*